May 8, 1951

G. V. SMITH 2,551,977

TREADLE-CONTROLLED AXLE-COUNTING
CIRCUIT FOR TOLL-CHECKING SYSTEMS

Filed May 9, 1947

INVENTOR.
GERARD V. SMITH
BY
Fred'k R. Schnetz
ATTORNEY

Patented May 8, 1951

2,551,977

UNITED STATES PATENT OFFICE 2,551,977

TREADLE-CONTROLLED AXLE-COUNTING CIRCUIT FOR TOLL-CHECKING SYSTEMS

Gerard V. Smith, Westwood, N. J., assignor to Ralph L. Thompson, Mineola, N. Y.

Application May 9, 1947, Serial No. 747,159

7 Claims. (Cl. 235—92)

The invention relates to apparatus for use in toll checking systems for vehicles passing a particular point of toll collection, as along a highway, and more especially to a system embodying a multi-switch treadle-controlled circuit whereby the respective number of axles of respective vehicles passing over a treadle embedded in the highway at the toll collection point is recorded by suitable counter means— one being provided for vehicles proceeding in one direction over the highway and another for vehicles proceeding in the opposite direction thereover.

Heretofore, systems of this nature as installed in a highway comprised a multi-switch treadle group of parallel elements embedded in said highway transversely thereto and including a first and a last treadle-actuated switch member and one or more intermediate switch members. The switches thus provided were adapted for sequential closing as a vehicle progressed over the treadle; and through intermediate circuits, relays, etc., serve for the actuation of the appropriate counter member. The arrangement in these prior systems is such that a count will be recorded only when the next to the last switch (in the direction of travel of a vehicle) has, in the sequential closing of the switches of a group, been opened and the last one retained closed. The first switch of a treadle group when actuated by an approaching vehicle served to determine the directional characteristic, while closure of the final switch effected the recording operation.

A treadle group usually comprises three or, preferably, four of the switch members, the latter being provided to improve the "angle-proofing" property of the system, by which is meant the maximum angle, allowable for correct recording, which an axle of the vehicle makes with the longitudinal axis of the highway over which the vehicle is proceeding. Generally when this angle exceeds approximately 13°, a second or false count may be recorded due to a further depression in sequence switch members by the trailing wheel of the counted axle before the leading wheel has left the treadle. A further difficulty is encountered as a result of pedestrains passing over a treadle which, it will be understood, is generally not over one foot in width, the greater the number of switches of a treadle, the greater being the "angle-proofing" action and the "foot-proofing" action or casual operation by pedestrians of the treadle since all switches must be closed sequentially and then a number less than the total number of switches involved must be opened, for proper recording, in the said systems.

The present invention has for an object to provide a system embodying, in general, the principles of the aforesaid systems but designed to enhance the factor of "angle-proofing" so that with a like number of switch elements to a treadle, the degree of "angle-proofing" will be substantially greater.

A further object of the invention is to provide, in a treadle-operated counter system, a circuit which will not affect a counter member of the system until all of the treadle-actuated switch elements have been consecutively closed and then opened, likewise consecutively, the final switch upon opening effecting operation of the counter member.

A still further object of the invention is to provide a circuit arrangement which will not permit operation of a counter member should a vehicle reverse its direction of travel at any time prior to clearing the final switch of a treadle.

Another object of the invention is to provide a circuit arrrangement wherein all of the switch elements of the treadle are utilized for counter member control, it not being required to restrict one of the group solely to the determination of direction of travel, the full effect of each switch as operated by the treadle being utilized.

Still another object of the invention is to provide a system which requires complete clearing of all of the treadle switches before a further count can take place.

The invention has for an object, also, to provide in the case of a 4-switch treadle, means to operate temporarily the circuits under 3-switch control should one of the intermediate switches become disabled; and, similarly, in the event of an end switch becoming disabled.

In carrying out the invention, the treadle comprises generally three or four treadle-operated switch or contact members, the respective switches being arranged parallel to one another and located on the highway or the like transversely to the direction of travel thereover, as is well understood. As heretofore operated, however, the final switch member is ineffective with respect to "angle-proofing" so that a 4-switch treadle would be required to provide the same "angle-proofing" afforded by a 3-switch treadle of the system herein set forth. To this end and contrary to the usual practice, which involves sequential closing of successive switch members with opening of the first while the succeeding one is still closed, recording being effected with the next to last switch member open and the last one closed, in my system the respective switch members are first to be consecutively closed and, similarly, consecutively opened, no effect of recording being had until the final switch member is opened. This applies in either direction of travel of a vehicle over the treadle and actuation of the particular first switch member characterizes the travel direction in the recording operation.

The nature of the invention, however, will best be understood when described in connection with the accompanying drawings, in which.

Figure 1:
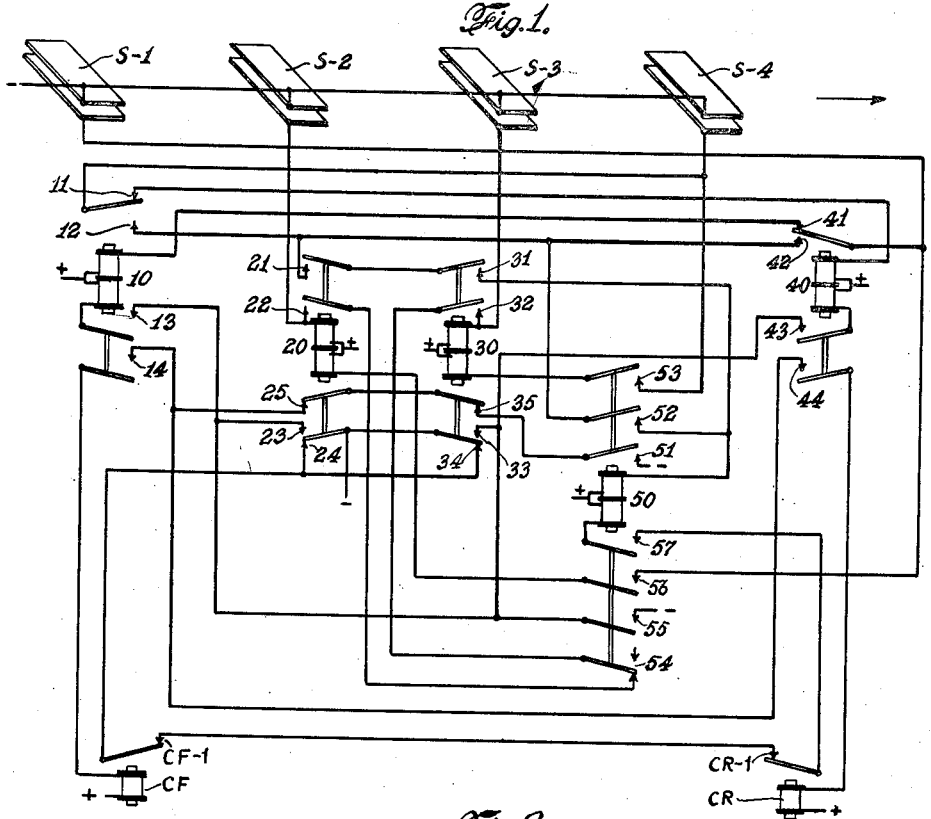
Fig. 1 is a diagrammatic representation of a treadle-operated counter system embodying the invention.

Referring to Fig. 1 of the drawings, a treadle block comprises a plurality of switch members S—1, S—2, S—3 and S—4, the treadle with its said switch members being adapted to be embedded in a roadway transversely thereof and over which vehicles may pass in either direction for operation of respective counter means represented by the relays CF and CR, one terminal of each being connected, for example, to the positive side of a suitable source of power (not shown), the former relay CF being adapted to respond to travel of a vehicle over the treadle, for example, in the direction indicated by the arrow, and the other relay CR to travel in the opposite direction, as is well understood in the art.

To effect this actuation and control of the counter member relays, the respective switch members S—1, S—2, S—3 and S—4 are adapted for connection electrically therewith through a novel system of relays 10, 20, 30, 40 and 50 operating multiple contacts through movable switch arms or armatures, the arrangement being such that an end switch member S—1 or S—4 determines the selection of the proper counter means depending on the direction of travel, although operation of all of the switch members is necessary before actuation of the selected counter member is effected.

To this end, each of the switch members has associated therewith and controls a corresponding double-coil or double-wound relay of the telephone type, one coil thereof constituting an operating coil and the other serving as a hold-in coil for the particular relay. The intermediate or common power connection to these pairs of coils is to the same side of the power source as in the case of the counter means, in the instant embodiment the positive side. However, the particular switch contact element of a treadle switch member normally not connected with relay circuits, is to be connected then with the opposite or negative side of the power source. The respective cooperating elements of the said switch members are connected with their respective relays 10, 20, 30 and 40 as follows. Thus, the switch member S—1 is connected through a normally closed switch contact 41 of the relay 40 with the operating coil of the relay 10 associated with switch S—1. The switch S—2 is connected directly with the operating coil of relay 20; and, similarly, the switch S—3 with the operating coil of relay 30. In the case of the relay 40, its operating coil is connected to switch S—4 indirectly through a normally closed contact 11 of relay 10.

An additional relay, namely the relay 50, and also of the double-coil or double-wound type having its intermediate or common power connection to the positive side of the power source, has no connection normally with the treadle switches S—1, S—2, S—3 and S—4; and serves primarily to control the supply of electrical energy to the counters after determination has been made by said relay regarding the status of the treadle switches as to the fulfillment of the requirements of the novel system with respect to the sequential closing and opening of said treadle switches.

Further and normally open contacts 12 and 42 are controlled by the respective switches S—1 and S—4, while the relays 20 and 30 control through their operating and holding coils further and normally open contacts 21, 22 and 31, 32, respectively, when the respective said coils of the relays 10, 20, 30 and 40 are energized through the closing of the switches S—1, S—2, S—3 and S—4, respectively. The coils of the relays control respectively, also, normally open contacts 13, 14 of relay 10; a normally open contact 23 and two normally closed contacts 24 and 25 of relay 20; a normally open contact 33 and two normally closed contacts 34 and 35 of relay 30; and two normally open contacts 43 and 44 of relay 40. Contacts 23 and 33 are connected in parallel and through a normally open contact 55 of relay 50 may be connected to the negative side of the source of power.

In the case of the relay 50, three normally open contacts 51, 52 and 53 are controlled thereby, the one element of contact 51 being connected to the negative side of the source of power. The said relay controls, also, a normally closed contact 54 and three normally open contacts 55, 56 and 57, the one element of the contact 55 being connected to the negative side of the source of power. The respective counter means relays CF and CR control normally closed contacts CF—1 and CR—1; and the normally open contacts 14 and 44 of relays 10 and 40, when closed, are designed to place alternatively a corresponding one of the two said relays in series with the negative side of the source of power through the normally closed contacts 25 and 35 of relays 20 and 30 and the contact 51 of relay 50 when the latter is energized. Energization of either one of the said relays CF or CR will open a corresponding normally closed contact CF—1, CR—1, in addition to effecting the desired record.

The opening by a relay CR or CF of its corresponding contact CR—1 or CF—1 serves to interrupt the holding circuit of the relay 50, opening thereby the contact 57 of the relay so that any false or secondary recording through additional operation of a counter means relay cannot occur, as otherwise might be the case should, for example, a vehicle have rolled backwardly after having cleared a final switch S—4 or S—1. Relay 50 will be energized through its operating coil when the contacts 31, 21 have been closed by their respective relays 30, 20 and the switch S—4 is actuated, it being understood that the contact 12 remains closed since relay 10 is still held in.

Before operation of the said relays CF and CR may be effected, however, it is necessary that the circuit to the holding coils of relays 20 and 30 be interrupted, said coils having been energized upon energization of relay 50 through its contacts 56 and 53, respectively, and the switch members S—1 and S—4. The holding coil of said relay 50 also is not effective until relays 20 and 30 have become de-energized, this hold-in action on relay 50 being the result of closing of contacts at 57, CR—1, CF—1, 24, but will no longer prevail so soon as either of the contacts CR—1 or CF—1 is opened by the corresponding relay CR or CF as energized, for example, in the case of relay CF when switch S—4 is opened by a vehicle proceeding in the direction of the arrow clearing said switch.

Opening of a contact CF—1 or CR—1 is effected respectively from the relay 50 through its contact 51 and through contacts 35, 25 and 14 in the former case, and contacts 35, 25 and 44 in the latter case.

Operation of the novel circuit system is as follows, it being assumed that a vehicle travels over the treadle in the direction indicated by the arrow. As the first switch S—1 of the treadle switch members is closed by the passage thereover of a pair of wheels of the vehicle, the operating coil of relay 10 is energized through the closed contact 41 of relay 40. This opens the contact 11 and closes the contact 12 of said relay, as well as its contacts 13 and 14. The former controls a circuit for operation of the holding coil of relay 10 including further normally open contacts 23, 33 of relays 20 and 30, respectively, to the negative side of the source of power, as well as a normally open contact 55 also to the negative side of the source of power. The holding coil thus would not become energized at the contact 55 until relay 50 becomes energized. However, such energization will be effected both upon the closing of switch S—2 and the switch S—3, the same occurring as a vehicle wheel passes thereover.

In the case of relay 20, energization of its operating coil closes the circuit to the holding coil of relay 10 to the negative side of the source of power at contact 23 of relay 20 and through the contact 13 of relay 10 to hold in said relay. Similarly, relay 30 when energized closes the contact 33 to the negative side of the source of power to hold in said relay 10, it being understood that the treadle arrangement of the switches is such that the latter switch S—3 will become closed before the former switch S—2 opens, the treadle switches being spaced apart accordingly.

Contact 14 of the relay 10 and the similar contact 44 of relay 40 are included in series with each other and with the coils of counter relays CF and CR, having one side connected to the positive side of the power source; and provision is made to connect the said coils alternatively to the negative side of said power source at the normally open contact 51 of relay 50 through normally closed contacts 25, 35.

The particular counter relay selected will depend upon which of the contacts 14 or 44 is closed.

As soon as switch member S—2 is closed, switch member S—1 may open but this will not alter the contact status set up by the former energization of relay 10 since its holding coil has become energized in the meantime. The closing of switch member S—2, however, has interrupted the circuits to the CF and CR relays so that neither of these may be energized upon a subsequent energization of relay 50 to close the contact 51; and this interruption will continue also under energization of relay 30, so that both of these relays must become de-energized before a count may be effected, that is to say, the last switch member S—4 must be first closed.

Energization of the operating coil of relay 50 is effected upon closing of switch member S—4 through the closed contacts 31, 21 of associated relays 30, 20 and the contact 12 of relay 10 which is still energized through its hold-in coil, operating coils for the relays 20 and 30 remaining energized, through their respective contacts 22, 32 and the normally closed contact 54 of relay 50, from the closing of switch member S—3 when switch member S—2 is opened. With the closing of switch member S—4 and energization of the operating coil of relay 50, the holding coil of relay 30 becomes energized through the closing of the contact 53 of relay 50 and closed switch member S—4, also the holding coil of relay 10 becoming further energized through closing of contact 55 connected with the negative side of the source of power.

The closing of contact 56 of relay 50 would connect the holding coil of relay 20, when contact 42 of relay 40 is closed, in case of reverse travel of a vehicle, with the negative side of the power source at switch member S—4 and through contact 52 and the contacts 31, 21 and 12. Relay 40, however, does not become energized when the travel over the treadle is in the direction indicated by the arrows.

The remaining contact 57 of relay 50 connects its holding coil, when the relay is energized through its operating coil as aforesaid, to the negative side of the source of power at contacts 24, 34 when their respective relays 20, 30 release, and through the contacts CF—1, CR—1. The release of relays 20, 30 completes through contacts 25, 35 of said relays also a circuit for one or the other of the counter relays CF, CR to the negative side of the power source at the contact 51 of relay 50. In the instant case this will energize relay CF, thereby also interrupting the circuit of the hold-in coil of relay 50. When the vehicle leaves the final switch member S—4, the operating coil of relay 50 also becomes de-energized through opening of the circuit thereat and at the contacts 31, 21 of relays 30, 20 which have become de-energized through the opening of their switch members S—3, S—2. The holding coil circuit of relay 10 will be interrupted at contact 23 as well as at the contact 55 of relays 20 and 50 respectively to restore also this relay 10 to the de-energized state, and the entire system to its normal condition.

With travel over the treadle in the reverse direction, switch member S—4 is the first of the group to become energized and operates in like manner to switch member S—1, which latter switch member then does not function to energize its relay 10. The remaining switch members S—2, S—3 function in the reverse order but also in the manner described hereinbefore in the case of travel of a vehicle in the direction indicated by the arrow. However, with the reverse travel, relay 40 operates to close contact 44 thereby to energize counter relay CR rather than the counter relay CF.

Should switch member S—1 be operated by the trailing wheel of a vehicle crossing the treadle at an angle and before the leading wheel of the axle common to both wheels has left switch member S—4, relay 20 will be operated through its holding coil since contact 56 of relay 50 is closed. This will prevent operation of the counter relay CF when the said leading wheel leaves switch member S—4 since the counter circuit has been interrupted at contact 25 through the energization of the said relay 20. No operation of counter relay CF will then take place until the said trailing wheel of a vehicle clears the final switch member S—4. Similarly, a vehicle travelling in the reverse direction will, through its trailing wheel, cause the switch member S—4 to effect operation of relay 30 by its holding coil through the closed contact 53 of relay 50. This will prevent operation of counter relay CR when the leading wheel of a vehicle leaves switch member S—I since the circuit is interrupted at the contact 35 of said relay 30. "Angle-proofing" in both directions is thus assured by the novel system.

In case a vehicle has progressed sufficiently to cause switch member S—3 to open but still hold switch member S—4 closed and the vehicle should then back, no operation of relay CF would occur to effect a record of forward travel. Neither may a reverse count or record be effected through operation of relay CR by continuing the reverse travel to an extent to clear switch member S—I, since the switch member S—4 has never been opened in the particular sequence. In other words, no count will take place in such reversal unless the sequence is from an open state of the switch member S—4 through the remaining switches and including clearing of switch member S—I.

The novel circuit hereinbefore described affords the further advantage of being able to operate the 4-switch member treadle as a 3-switch member treadle in the event of a disablement of any one of the said switch members. In such case, the treadle will operate nevertheless to afford "angle-proofing" characteristics equivalent to 4-switch member treadles of the prior art. In the instant embodiment, if the disabled switch member be one of the intermediate ones, provision is made to connect its relay circuit to that of the other still active intermediate switch member, which then assumes the function of the disabled one. Should an end switch member fail, connection is to be made of its relay circuit to the immediately adjacent intermediate switch member which at the same time is disconnected from its relay circuit and said relay circuit connected to the relay circuit of the remaining intermediate switch member.

Figure 2:
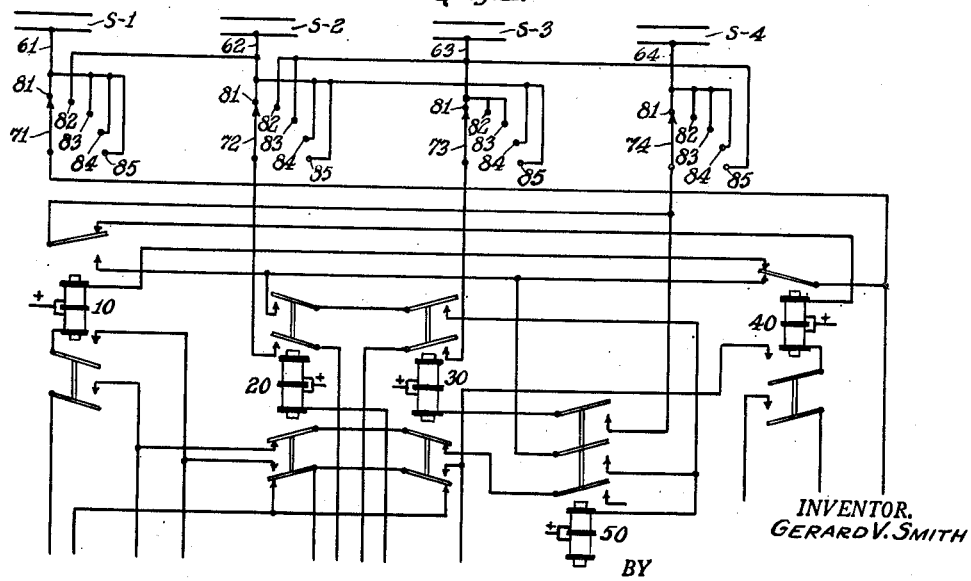
Fig. 2 is a fragmentary diagrammatic view illustrating a modification with respect to the number of treadle switches operated.

Thus, reference being had to Fig. 2 of the drawings, there is interposed in the main leads 61, 62, 63 and 64 from the respective switch members S—I, S—2, S—3, and S—4 and between these switches and their relays 10, 20, 30, 40 and 50, suitable switching means 71, 72, 73 and 74 which are actuated simultaneously and may be of a four-bank, non-shorting type of the nature of a so-called radio band switch. This switch is represented in the drawing by its respective elements each including five contact points 81, 82, 83, 84 and 85.

The operation of eliminating a disabled switch member is as follows, assuming, for example, that the switch member S—I is no longer operative to effect closing of a circuit through lead 61 upon a vehicle passing over said switch member of the treadle. It is necessary then to advance the switch arm of switch 71 from the first contact 81 to the second one 82. This will further open the lead 61 and cut out entirely the switch member S—I; and at the same time the corresponding relay circuit including relay 10 will be transferred to the switch member S—2 through its connection to lead 62, the relay circuit of this switch member having been interrupted by the opening of lead 62 at the contact 81 of switch 72. This relay circuit, represented by relay 20, however, is transferred to the relay-circuit of switch member S—3 through the connection from the second contact 82 of switch 72 to the lead 63 of said switch member S—3. While the switch arm of switch 73 has been shifted to the second contact, this does not interrupt the lead connection to its relay circuit since said second contact is connected thereto. This applies also to a similar contact of switch 74 with reference to the lead connection 64 from switch member S—4, except in the case of the fifth and last contact 85 which is connected to lead 63 from switch member S—3.

When the switches are positioned on their respective third contacts 83, no change from normal is made with respect to lead 61 and this applies also in the case of the remaining contacts 84 and 85 of switch 71. Lead 62, however, is again interrupted in this stage, switch member S—2 being the disabled one, and its functions are assumed by switch member S—3 to which its relay circuit is connected through lead 63 of said switch member S—3. Switch member S—4 functions normally in this contact position as well as in the subsequent position on the fourth contact 84. This location of the switch elements cuts out switch member S—3 through interruption of the lead 63, but transfers its relay circuit to that of switch member S—2 through the connection to its lead 62.

In the final contact position, switch members S—I and S—2 function normally with relation to their relay circuits; and the lead 64 from switch member S—4 is interrupted and its relay circuit transferred to the relay circuit of switch member S—3 through connection to lead 63, with transfer of the latter member's relay circuit to switch member S—2, the operation being similar to the action in the case of switch member S—I when it is disabled.

I claim:

1. In a treadle-controlled axle-counting system including a treadle with an initiating switch member, a final switch member and at least one intermediate switch member, and a pair of relay-operated counter members—one for forward travel of a vehicle over the treadle and the other for travel thereover in the reverse direction: an electrical relay circuit system comprising relay-controlled means and including a control relay interconnected with said system to complete a circuit to operate the forward counter member only when all of the switch members of the treadle have been depressed sequentially and then opened sequentially by a vehicle proceeding over the treadle in one direction, and relay-controlled means to operate the reverse travel counter member only when all of the said switch members have been depressed sequentially and then opened sequentially by a vehicle proceeding over the treadle in the reverse direction.

2. In a treadle-controlled system including a treadle with an initiating switch member, a final switch member and at least one intermediate switch member; a pair of relay-operated counter members—one for forward travel of a vehicle over the treadle and the other for reverse travel thereover: an electrical relay circuit system connecting the counter member relays with the switch members and comprising a relay controlled by the initiating end switch member; a relay controlled by an intermediate switch member; a relay controlled by the final switch member only when the direction of travel over the treadle is reversed, the said relay controlled by the initiating switch member then remaining inactive; and a control relay interconnected with the said relays—all of the relays being of the multi-contact type, whereby when the initial switch member is closed the first relay will be energized and similarly when an intermediate switch member is closed its corresponding relay will be energized, and when the final switch member is closed the control relay will be energized, whereupon only when the final switch member is opened in the same sequence the appropriate counter member relay means will be energized.

3. A treadle-controlled axle-counting system according to claim 2, wherein switching means are provided to interrupt the circuit from one of the treadle switch members to its relay circuit and to transfer the latter to a selected member of said treadle switch members.

4. A treadle-controlled axle-counting system according to claim 2, wherein switching means are provided to interrupt the circuit from one of the treadle switch members to its relay circuit and to transfer the latter to a selected member of said switch members, the relay circuit of the said selected member being thereby also disconnected from its relay circuit and the latter at the same time being connected to the relay circuit of an adjacent switch member.

5. A treadle-controlled axle-counting system according to claim 2, wherein switching means are provided whereby two adjacent treadle switch members may be disconnected from their respective relay circuits and the function of one switch member transferred to the other switch member with the relay circuit of the latter transferred to the next adjacent and active switch member.

6. A treadle-controlled axle-counting system according to claim 2, wherein switching means, each including contacts in number equalling the number of treadle switch members plus one, are associated with an intermediate member and with each of the end switch members, respectively, whereby by actuating the said switching means to select appropriate contacts thereof any desired switch member of the treadle may be disconnected from its relay circuit and its function transferred in the case of the end switch members to a next adjacent intermediate member and in the case of an intermediate switch member to its next adjacent member.

7. In a treadle-operated axle-counting system, the combination with a treadle including four pairs of individually and sequentially-operable, normally-open contact members, and a pair of electromagnetically-controlled counter means, one being responsive to travel of a vehicle over the treadle in one direction and the other counter means to travel of a vehicle in the opposite direction over said treadle; of an electrical control system intermediate the treadle and the counter means, comprising a source of electrical energy, one side thereof being connected to corresponding elements of the respective pairs of treadle contact members, and the opposite side to one terminal of the respective electromagnetically-controlled counter means; a first relay, a second relay, a third relay, a fourth relay, and a fifth relay—all being multi-contact relays and of the double-wound type embodying an operating winding and a holding winding having intermediate connection to the said opposite side of the source of electrical energy; a connection from the non-energized element of the first pair of treadle contact members to the operating winding of the first relay, including a normally closed contact under control of the fourth relay for interrupting said connection of the first pair of treadle contact members; a connection from the non-energized element of the second pair of contact members to the operating winding of the second relay; a connection from the non-energized element of the third pair of contact members to the operating winding of the third relay; a connection from the non-energized element of the fourth pair of contact members to the operating winding of the fourth relay, including a normally closed contact under control of the first relay for interrupting said connection of the fourth pair of contact members; a further connection from the non-energized element of the fourth pair of contact members to the holding winding of the third relay, including a normally open contact under control of the fifth relay; a connection, to the said one side of the source of electrical energy, from the holding winding of the first relay, including a normally open contact under control of said first relay and a normally open contact under control of the fifth relay, there being an intermediate connection to the one side of the source of electrical energy also through normally open contacts under control of the second and third relays, respectively, and a further intermediate connection to the holding winding of the fourth relay, including a normally open contact controlled by said fourth relay; a connection, to the said one side of the source of electrical energy, from the holding winding of the second relay, including a normally open contact under control of the fifth relay and the first pair of contact members; a connection, to the said one side of the source of electrical energy, to the holding winding of the fifth relay, including a normally open contact under control of said relay, two additional and normally closed contacts, respectively under control of the pair of counter means in series with each other and the said last-named fifth relay normally open contact and with two normally closed contacts connected in parallel with said one side and controlled respectively by the second and the third relays; a connection, to said one side of the source of electrical energy, through a normally open contact controlled by the first relay, included in series with the one electromagnetically-controlled counter means and with two normally closed contacts controlled respectively by the second and third relays and with a normally open contact controlled by the fifth relay, said connection being in shunt also with the other of the counter means and a normally open contact controlled by the fourth relay; a pair of normally open contacts connected in series with each other and adapted for connection with the normally non-energized elements of the first and fourth of the pairs of treadle contact members, one of the normally open contacts being under control of the first relay and the other under control of the fourth relay, a connection being made intermediate the said pair of contacts to series-connected, normally open contacts controlled respectively by the second and the third relays and to a normally open contact of the fifth relay and to its operating winding, together with a connection from the series-connected contact controlled by the third relay directly to the said operating winding of the fifth relay; and a pair of normally open contacts, one of the terminals of each being connected in series with a normally closed contact controlled by the fifth relay and the other terminals being connected respectively to the non-energized elements of the second and third threadle-operated contact members and to the respective energizing windings of the second and third relays.

GERARD V. SMITH.

REFERENCES CITED

The following references are of record in the file of this patent:

UNITED STATES PATENTS

| Number | Name | Date |
|---|---|---|
| 2,166,090 | Cooper | July 11, 1939 |
| 2,205,555 | Cooper | June 25, 1940 |
| 2,268,925 | Cooper | Jan. 6, 1942 |
| 2,313,627 | Cooper | Mar. 9, 1943 |
| 2,483,394 | Barker | Oct. 4, 1949 |